April 24, 1956 R. KROHN ET AL 2,743,168
SUBLIMATION APPARATUS
Filed Sept. 9, 1944 3 Sheets-Sheet 1
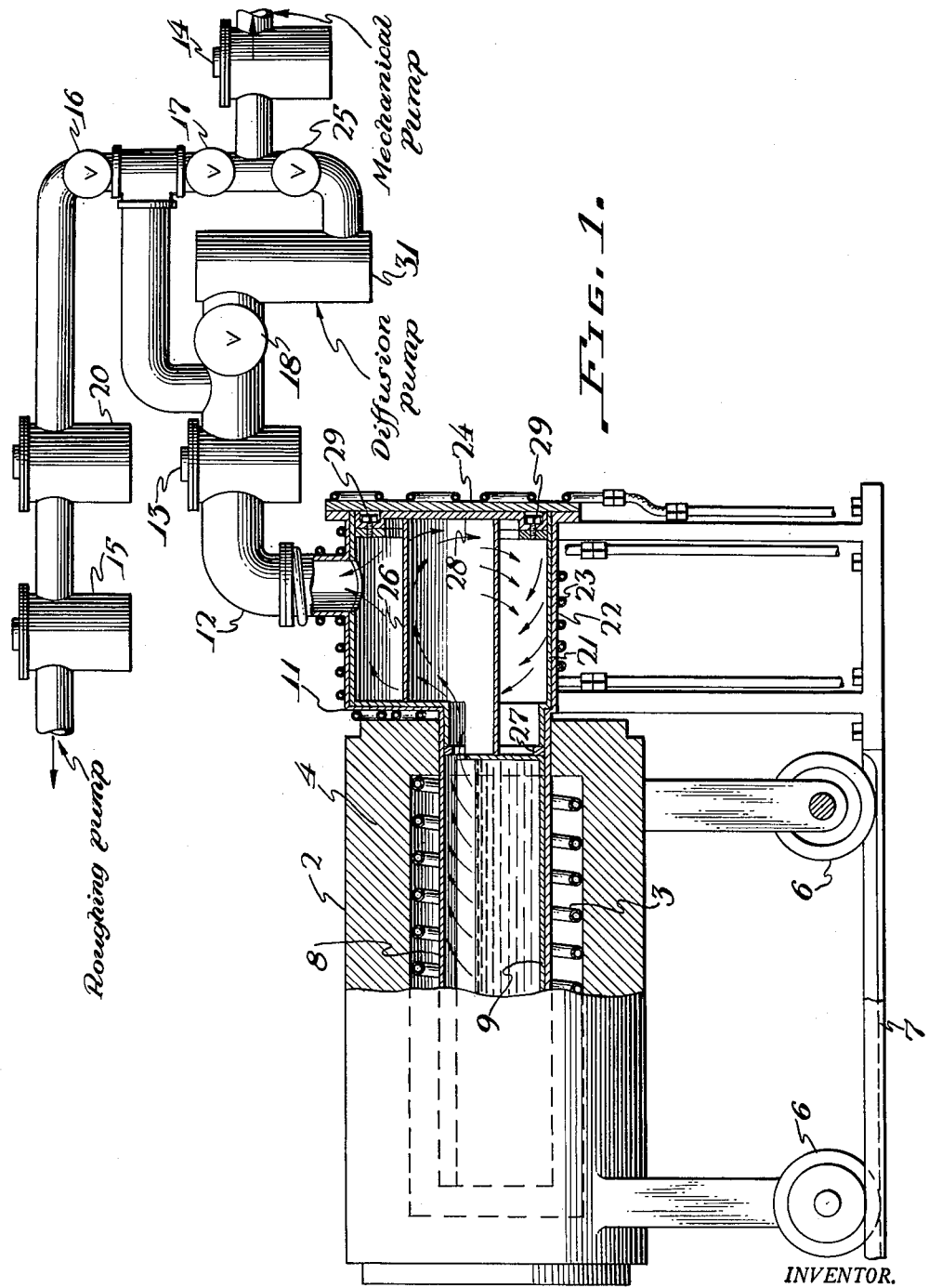
INVENTOR.
Roy Krohn +
Robert J. Schmidt
BY

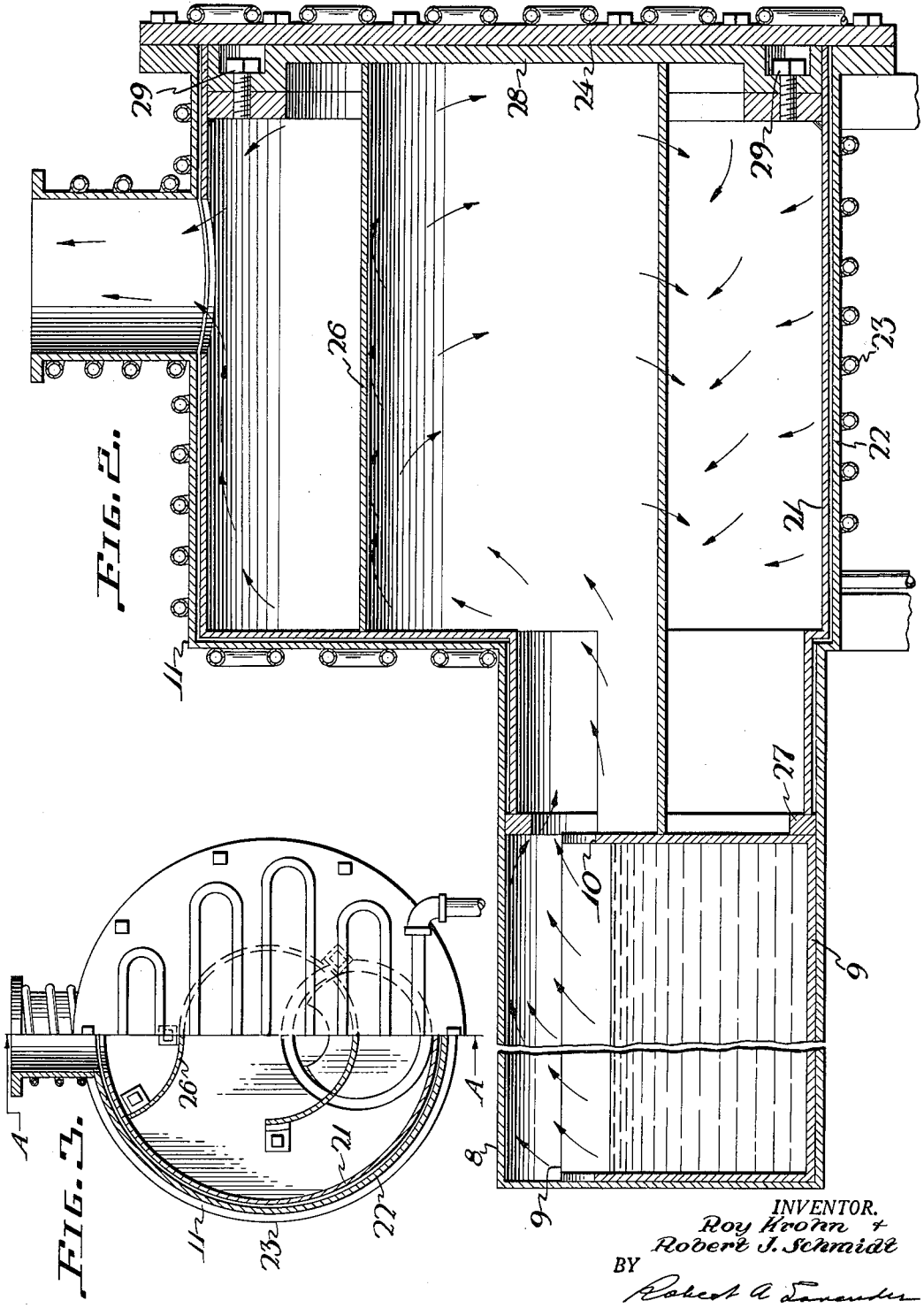

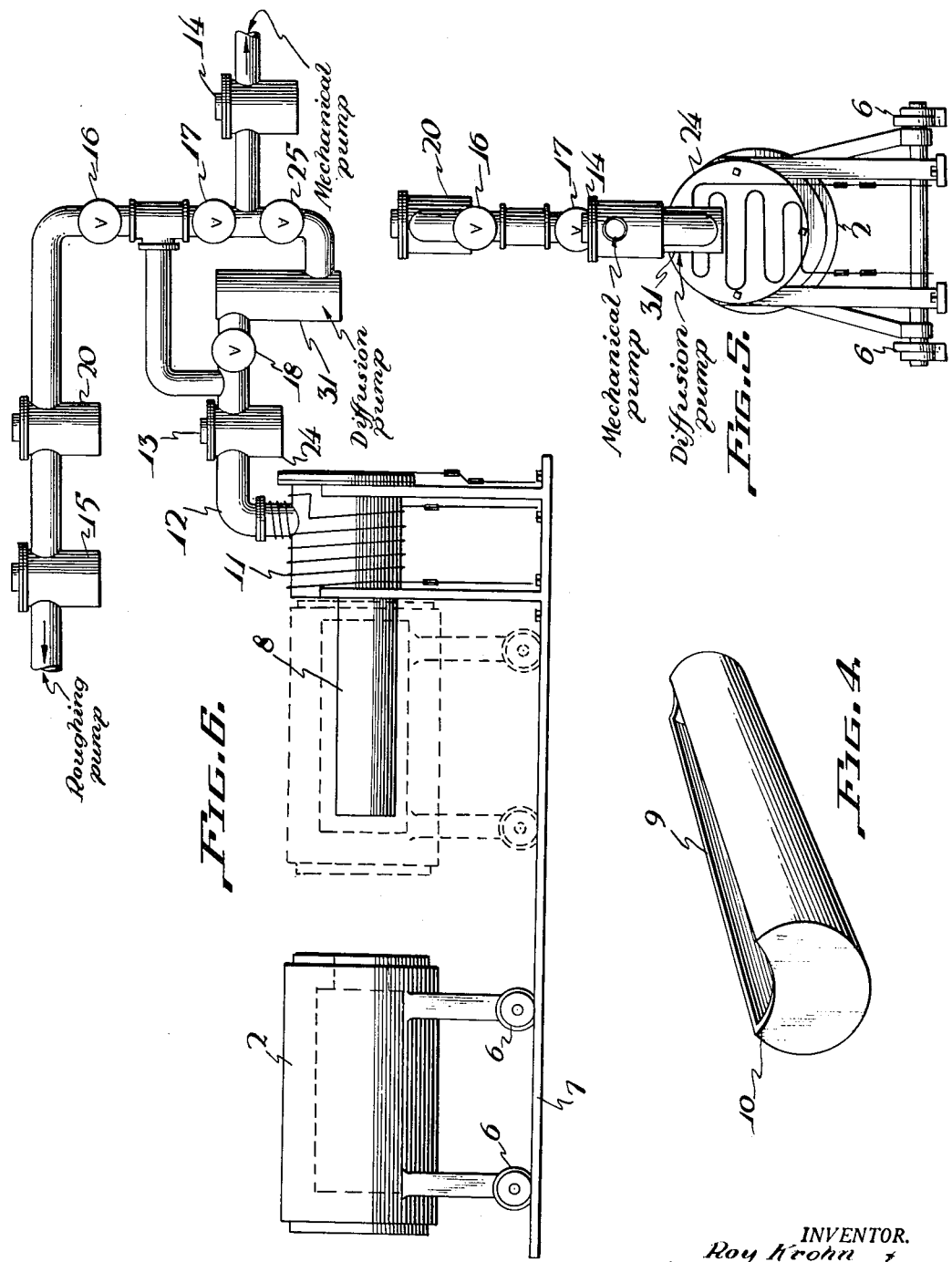

United States Patent Office 2,743,168
Patented Apr. 24, 1956

2,743,168

SUBLIMATION APPARATUS

Roy Krohn, Berkeley, Calif., and Robert J. Schmidt, Oak Ridge, Tenn., assignors, by direct and mesne assignments, to the United States of America as represented by the United States Atomic Energy Commission Application September 9, 1944, Serial No. 553,446

6 Claims. (Cl. 23—264)

This invention relates to a sublimation process and apparatus. More particularly, this invention concerns a process and apparatus especially adapted for the treating of uranium compounds such as the halogen derivatives thereof to obtain purification, the formation of a desired crystal structure and other improvements in the compounds, and is related to the copending application of Hecker, Serial Number 552,557.

In general, the use of sublimation processes in the industry is old and well known, and a number of processes and systems have been proposed in the prior art. For example, the treatment of materials such as magnesium, aluminum chloride, and the like has been carried out by procedures wherein these materials are subjected to sublimation for the separation or purification thereof. The apparatus was comprised of tubes or retorts surrounded by a furnace or other heating device for volatilizing the materials being sublimed. The aforementioned parts are connected with condensing devices for collecting the sublimed materials.

More elaborate processes and apparatus have been developed particularly as respects the processing of magnesium materials. In such constructions the condensing units have been provided with baffles, removable liners, and other refinements. The sublimation apparatus has in many instances been of a vertical type requiring the use of an overhead crane or comparable device for the opening thereof during charging or for other purposes.

Some of the devices and processes of the prior art have not been susceptible to speedy or efficient large scale continuous operation. Also, many of the devices are not suitable for the processing of uranium materials because of the refractory nature of this element, and the hard deposits which may be formed. In processing uranium materials there is the possibility of the formation of undesired amorphous sublimate unless the characteristics of the sublimation, conditions and condensation are controlled in a certain manner.

Certain vertical sublimation equipment and processes of operation have been proposed by others working closely in the field of the present invention. The present construction is believed to constitute an improvement over these last-mentioned sublimation units and processes in greater speed of operation, greater adaptability to large scale production, and capability of forming a high grade crystalline product particularly suitable for use in certain processes wherein there is a demand for a high quality uranium halide of the type producible by our process and apparatus.

We have discovered an improved sublimation apparatus and process that is particularly suited for the sublimation treatment of uranium materials, exemplified by the production of purified high grade crystalline uranium chloride.

This invention has for a general object to provide an improved sublimation process and apparatus.

Another object is to provide a sublimation apparatus that has improved characteristics from the standpoint of ease of operation, speed of operation, and freedom from excessive maintenance.

Still another object is to provide a sublimation apparatus that may be constructed without extreme requirements as to mechanical tolerances in certain parts yet be used under conditions of exacting specifications.

Another object is to provide an apparatus that is adapted to operate under reduced pressure conditions together with an arrangement of parts for obtaining the aforementioned reduced pressure.

Still another and particular object is to provide an apparatus that is especially suitable for use in the processing of uranium materials.

Still another object is to provide an apparatus of the aforementioned type wherein the resultant sublimed materials may be obtained in the form of large homogeneous crystals which product is stable under relatively dry conditions.

Still another object is to provide an apparatus of the type described that is adapted to operate in conjunction with a vacuum system and which cooperates therewith in a manner so that the pumping oils and other components of the vacuum system have a longer life and are subject to fewer operational difficulties.

Another object of this invention is to provide an improved process for sublimation.

Still another object is to provide a sublimation process for application to uranium materials particularly halogen derivatives of uranium.

Still another object is to provide a sublimation process that may be operated under various degree of reduced pressure.

Another object is to provide a sublimation process wherein there is warm or hot condensation.

Other objects will appear hereinafter.

We have found that a particularly suitable apparatus of the class described may comprise a horizontally positioned elongated heating container or boat for holding the charge to be sublimed connected in a particular manner with a special condensing chamber of larger diameter, the chamber being provided with a removable spiral shaped liner and other novel features as will be described in detail hereinafter.

For further understanding of our invention, reference is made to the attached drawings forming a part of the present application. In the drawings, Fig. 1 is a semi-diagrammatic side-elevation view of the complete sublimation apparatus assembly in which certain parts are broken away and other parts shown in section for clarity.

Fig. 2 is a sectional view of the condenser portion of apparatus taken on the line A—A of Fig. 3.

Fig. 3 is an end view of the aforementioned condenser unit which certain parts have been shown in section for clarity.

Fig. 4 is a detailed view of the boat assembly for holding the charge.

Fig. 5 is an end view of the complete assembly.

Fig. 6 is a side elevation view of the complete apparatus similar to Fig. 1, but showing in particular the manner in which the heating unit may be placed in position or removed.

Referring now to Fig. 1, reference numeral 2 represents a movable electric furnace. For encompassing protruding member 8, this furnace 2 may be moved into and out of position as better shown in Fig. 6

The furnace may be of conventional construction including suitable electric heating elements indicated at 3, insulation at 4, and various other usual parts for the construction and operation of electric furnaces. Wheels 6, which move on track 7, may be provided for permitting the movement of the furnace into and out of position as already referred to. The furnace 2 may be moved out of position for cooling, repair, and other similar purposes.

The protruding member 8 houses the charge boat 9, the latter being better shown in Fig. 4. Member 8 is connected to a condenser structure 11 of special design, better shown in Fig. 2.

The condenser 11, by means of conduit 12, is connected to one or more mechanical vacuum pumps (not shown), the traps 13, 14, 15, and 20, gauges and the like employed in an efficient vacuum system. While the particular vacuum system employed is not a limitation on the present invention, one arrangement comprising several different types of vacuum apparatus, which has been found to give good results is described herein. The vacuum system preferably includes various control devices (not shown) such as Pirani gauges, ionization gauges and the like.

The particular vacuum system employed in the present embodiment comprises three sources of reduced pressure. That is, the sublimation system may be interconnected through valve 17 and trap 14 to a mechanical pump such as a Kinney pump (not shown). Or the system may be connected through the valve 16 and traps 16 and 20 to a roughing pump (not shown). For very low reduced pressure, the system may be connected, by means of valves 18 and 25, to a diffusion pump diagrammatically illustrated at 31. The functioning of those various parts will be apparent from the description set forth hereinafter. However, briefly, the operation is as follows: Traps 13 and 14 are filled with a cooling medium, such as liquid nitrogen, liquid air, Dry Ice or the like. Valve 17 is open and the other valves are closed thereby throwing the pressure reduction onto the mechanical pump. After a preliminary heating to be described more fully, valve 17 is closed and valve 16 opened, traps 15 and 20 having been filled with a cooling medium as indicated in connection with traps 13 and 14. The system is then on the roughing pump. During this period trap 13 may be degassed and trap 14 removed and cleaned and replaced. After this cycle, traps 13 and 14 are refilled, valve 16 closed, valve 17 opened throwing the system back on the mechanical pump. Thereafter by closing valve 17 and opening valves 18 and 25, the diffusion pump may be cut into the system.

Referring now to Fig. 2, the condenser 11 includes an inner liner 21 wholly disconnected from the outer shell 22. By unbolting the condenser closure or head 24, the entire liner 21 may be pulled out of or removed from the apparatus. This is advantageous in handling hygroscopic materials. As indicated, the outside of the condenser 11 is provided with a number of cooling coils 23 of conventional design which may be connected to water lines through detachable connections.

Within the liner 21 but attached thereto is the convolute or spiral member 26, better shown in Fig. 3. This member functions to cause the vapor to move in an elongated, spiral path. Also, the metal member acts as a hot condenser as will be further described in connection with the functioning of the apparatus.

The liner 21 fits within the apparatus against boat 9 in a substantially vapor tight manner by means of the interposed sealing ring construction 27. This ring 27 is similar to an expansible automotive piston ring, and by expanding against the interior surface of member 8 gives a tight joint without the necessity of special machining of the various parts. This is an important feature, otherwise vapors might penetrate between the liner and the interior of the condenser causing the liner to freeze in the equipment. Also by this construction it is not required that the liner be fitted with extreme care within condenser 22, and slight clearance may be allowed to permit easy removal. The liner is, however, in sufficiently close association with the condenser so that heat transfer takes place. The liner has a removable head 28 attached thereto by bolts indicated at 29.

The boat 9 previously referred to, and shown in Fig. 4, is in effect a cylindrical tank with a portion cut away as indicated at 10. The boat may be constructed from corrosion and heat resistant material such as the commercially obtainable material "Hastelloy," or other high nickel alloy.

Referring now to the various incidental parts, the traps 13, 14, 15, and 20 are conventional liquid air or liquid nitrogen traps. They are adapted to contain a bulb into which may be introduced the liquid freezing medium which causes the condensation of condensables as they pass out of the apparatus through the conduit 12.

The protruding member 8 and the condenser 11 as well as various other parts are preferably constructed from corrosion and heat resistant steel as for example certain well known stainless steel compositions. Such steels include chromium and nickel and preferably include in addition a small content of another alloying element such as molydenum, columbium, tungsten, titanium, or the like. The various parts between the condenser and the sources of reduced pressure, as for example commencing with conduit 12, may be constructed from ordinary steel or other standard material usual for the construction of the particular part.

The functioning of the apparatus will be described by considering that the furnace portion has been pulled off as indicated in Fig. 6. Also, it will be considered that the condenser head 24 has been removed and that the liner 21 and other parts within the apparatus have been taken out.

The boat 9 is filled with a charge (100–225 lbs.) of, for example, a uranium chloride which it is desired to process in accordance with the present invention. The boat is slid into the protruding member 8 to the back thereof. Then the sealing ring, namely ring 27, is inserted into the front of the condenser and pushed back into member 8 so that the ring closely abuts the end of the boat. Inasmuch as the ring expands against the inner surface of 8, it effectively seals the boat in the end of the apparatus so that the vapors do not penetrate between the liner and the condenser. The liner is next pushed into place through the front of the apparatus so that it abuts the aforementioned sealing ring 27. By his construction, as already indicated, it is possible to obtain a satisfactory vapor-tight fit without the necessity of special machining or requiring the construction of the parts to within a particularly close tolerance. The cover plate 28 is inserted and secured in place. The head 24 of the condenser is bolted in place, and the various couplings to the water connections and the like made.

The traps 13 and 14 are then filled with cooling medium such as liquid nitrogen. The mechanical vacuum pump is connected into the system by opening the valve 17 slowly, then fully, and the system pumped down very slowly to about one-tenth millimeter of mercury pressure. It is desirable that the rate of reducing the pressure at the start of the process be slow in order to prevent solid particles from being carried over into the vacuum system mechanically. After the preliminary reduction in pressure, the pump may be permitted to run at full rate for at least 15 minutes to degas the charge. That is, air, entrapped gases or other volatiles removable by reduced pressure are pumped out. The degassing is facilitated by raising the temperature of the charge materials as indicated in the next step.

The heater 2 is then rolled into place as shown in Fig. 1, and the current turned on, slowly raising the furnace temperature to approximately 250° C. The temperature range, namely, the furnace temperature is between approximately 250° C. and 450° C., and a period of about two hours would be employed for carrying out the initial heating. During approximately the next two hours of heating, the temperature of the furnace is permitted to rise to between 550° C. and 650° C.

During this later heating period, valve 17 is closed and valve 16 on the roughing line is opened. In order to clean the system of materials stopped by trap 13, the liquid air is removed from trap 13 then steam is introduced into trap 13 so that condensate such as HCl, $COCl_2$ and the like, is volatilized out through the roughing line, and recondensed in liquid air traps 15 and 20 if desired. The liquid air traps are again filled with either liquid nitrogen or liquid air and the system again connected onto the mechanical pump by closing valve 16 and opening valve 17. The reduction in pressure is continued until it is sufficiently low to permit cutting in the diffusion pump 31 by opening valves 18 and 25.

The temperature of the furnace is now within the range of approximately 700° C. to 825° C., and the ultimate degree of reduced pressure at the top of the diffusion pump would be of the order of $2 \times 10^{-5}$ millimeters of mercury. It is not entirely essential that the system be placed under this high degree of reduced pressure as sublimation of the uranium halides may be carried out under reduced pressure of the order of 30 or 40 millimeters of mercury. It is desirable, however, that a sufficient degree of reduced pressure be maintained as respects the particular material being processed so that the system does not at any time pass through the liquid phase. In other words, the uranium chloride should sublime directly and completely from the solid to the vapor. If liquid uranium chloride forms in the system, because of its corrosive action, the various metal parts may be corroded and injured. The magnitude of the temperature is not particularly critical, it merely being desirable to maintain adequate temperature for causing the materials to sublime. The temperature of the particular uranium chloride being described may be raised to not more than about 586° C., namely the melting point of $UCl_4$.

With the process functioning under the aforementioned temperature and pressure conditions, the vapors speedily pass out of the boat 9 into the interior of the metal spiral 26, and then around the metal spiral. This metal spiral 26 functions to cause the vapors to pass in an elongated path before they can reach the exit conduit 12. During their passage they become condensed on the metal spiral 26 in the form of an excellent crystalline product. This is obtained by a warm or hot condensation, since the temperature of the metal spiral 26 is in this example between 300° C.–400° C. That is, the condensation is relatively non-chilling as compared with usual condensation. Such temperature is obtained by the positioning of this metal spiral or baffle 26 at a predetermined distance from the outer, water-cooled condenser surface. Since the interior of the apparatus is under reduced pressure, there is practically no cooling by conduction. Consequently, the spiral is cooled principally by radiation. If the metal spiral is too cold, this will cause the condensation of amorphous product. By interposing this metal spiral or convolute 26, practically all of the sublimed product is condensed out so that none passes out of the system through conduit 12.

After the process has continued for a sufficient period (the entire cycle may consume eight to twelve hours or more) so that substantially all of the material in boat 9 has been sublimed, the furnace 2 may be rolled off to the position indicated in Fig. 6, and the apparatus permitted to cool. The apparatus is preferably slowly air cooled for about three-quarters of an hour prior to the application of any severe external water-cooling. The cooling may be expedited by introducing a dry, inert gas as nitrogen within the condenser chamber thereby providing a medium through which the heat may be transferred by conduction. This may be accomplished by bleeding in nitrogen in a conventional manner through a nipple attached to the condenser or by any other suitable provision. After the equipment has cooled down sufficiently, the condenser head 24 is removed. The liner 21 may be pulled out, capped and taken to a dry box where the sublimate may be chipped out and placed in suitable containers. Inasmuch as the purified, sublimed-product is hygroscopic, it is desirable that the material be maintained in a dry atmosphere.

Thereafter the apparatus may be cleaned as by washing, dried and another boat, ring, and liner inserted, and the process repeated on another batch of crude material. The apparatus is advantageous in that, from the practical standpoint, it provides equipment at a convenient working height. The purified product may be removed and kept dry. By means of the removable liner arrangement, repeated charges may be processed without delay while the sublimed product is being removed from the liner and packed in containers. By means of the metal spiral arrangement, carryover to the vacuum system is substantially eliminated so that the pump oils employed in the vacuum system, as in the diffusion pumps, last several times longer. In addition, the product obtained by the process comprises large and homogeneous crystals which are satisfactory for use in such processes as isotope separation.

Still further examples of our process applied to the sublimation of uranium chloride are set forth below in tabular form.

|  | No. 1 | No. 2 |
|---|---|---|
| Charge (crude) | 148.2 lbs | 196.5 lbs. |
| Sublimation period | Approx. 6¾ hrs | 12 hours. |
| Temperature | 590° C. rising to 700° C. | Approx. 760° C. maximum |
| Vacuum (final) | $5 \times 10^{-5}$ mm. Hg | $3 \times 10^{-5}$ mm. Hg. |
| Overall time | 10 hrs | 17 hours. |
| Yield (sublimate) | 108.6 lbs | 183 lbs. |
| Residue | 30.8 lbs | 6.5 lbs. |
| Loss | 8.8 lbs | 7 lbs. |

The product obtained in the above examples was in the form of homogeneous crystals which were removed from the liner and placed in containers. The process has been described as applied to the treatment of uranium materials as the process has been found to give particularly satisfactory results in converting commercially produced uranium material to a refined, high grade product. While our invention is particularly adapted to the treatment of uranium materials, it may, in general, be applied to the treatment of various other materials susceptible of sublimation. For illustration there may be mentioned aluminum chlorides, iron chlorides, and certain organic compounds. When processing some of these other materials, it may be desirable that the condensation be at a lower temperature as below 100° C.

As indicated, certain of the temperatures referred to herein are described as furnace temperatures. The temperature of the charge materials lags below the furnace temperature. That is, the temperature of the charge gradually rises from its temperature, as for example room temperature, as charged approaching the furnace temperature or reaching its volatilization temperature at which temperature the charge remains until volatilized.

The degree of reduced pressure employed is generally below 50 millimeters of mercury. The particular lower limit of reduced pressure is determined to some extent by the efficiency of the reduced pressure system. By means of the diffusion pumps and other parts described, reduced pressures of the order of $2 \times 10^{-5}$ are obtainable. With other pumps still lower pressures may be obtained and used. In general, the function of the reduced pressure is to eliminate air from within the apparatus which might oxidize the charge and also to provide a pressure under which sublimation occurs.

The term sublimation is employed herein in the conventional sense, and refers to a process in which volatilizable materials are caused to pass from the solid to the vapor phase without passing through the liquid phase.

In applying the process and apparatus to other materials having different melting points and other properties, suitable adjustment would be made in the process for such differences. Also changes may be made in the apparatus.

For example, referring to the condenser and liner construction described as cylindrical, this may be modified. These parts may be constructed in the shape of a truncated cone. In such construction the liner would fit closer against the condenser thereby giving additional heat transfer. Rather than employing electrical heating, a gas-fired furnace or the use of heat transfer liquids may be employed. Other modification will be apparent to those skilled in the art.

It is to be understood that all matter contained in the above description and examples are illustrative only and do not limit the scope of this invention, as it is intended to claim the invention as broadly as possible in view of the prior art.

We claim:

1. A sublimation apparatus adapted for operation under reduced pressure which comprises a movable heating unit, a condenser member, a protruding member extending axially from the condenser member, said protruding member being of smaller diameter than said condenser and adapted to be received in said heating unit, means positioned in the protruding member for receiving a charge to be treated, a liner and baffle positioned within said condenser, said baffle extending inwardly from said liner, ring means positioned between the charge receiving means and liner, and means for reducing the pressure within said condenser.

2. A sublimation apparatus adapted for operation under reduced pressure which comprises a portable heating unit, a condenser portion having a protruding member attached thereto and extending axially therefrom, said protruding portion being adapted to be housed by said heating unit, means for containing materials to be treated positioned within said protruding member, a liner and baffle positioned within the said condenser, said baffle extending spirally inward from said liner, and an expansive sealing ring positioned between and engageable with the material containing means and liner for making a substantially vapor-tight seal between said liner and said material containing means.

3. A sublimation apparatus which comprises a condenser member, a still in communication with the condenser member, a movable heating unit for said still, a container for reception of a charge, said container positioned within said still, a combination liner and substantially coextensive spiral element positioned within said condenser, a sealing ring means positioned between the container and liner, means for reducing the pressure within said sublimation apparatus, and heat transfer means for cooling said condenser.

4. A sublimation apparatus which comprises a horizontally positioned movable heating unit, a condenser member, an elongated still projecting outwardly from and in communication with the condenser member, said still being adapted to be housed in said heating unit, a boat for the reception of chemical materials positioned in said still, a removable liner with a spiral element therein positioned within said condenser, said spiral element being substantially coextensive with and extending inwardly from the liner toward the axis of said condenser, a sealing means interposed between the boat and said liner, and a plurality of cooling coils engageable with the condenser for effecting a heat exchange relationship therewith.

5. An apparatus of the class described which comprises a tubular heating unit, a condenser member having an elongated horizontally positioned extension defining a still, at least a part of said still being adapted to be inserted in and housed by said heating unit, a charge receiving boat positioned in said extension, a removable liner with spiral shaped baffle disposed within said condenser, a sealing ring positioned between the boat and liner, means for reducing the pressure within the condenser, and a plurality of cooling coils disposed about the condenser for effecting a heat transfer.

6. An apparatus of the class described which comprises a tubular movable heating unit, a condenser member having an extension projecting therefrom for insertion into said heating unit to define a still, an elongated boat positioned within said extension to provide a container for charge materials, a removable liner having an internal spiral shaped baffle contained within said condenser, a sealing means positioned between the boat and liner and engageable with the inner wall of the condenser to prevent volatilized chemical materials from penetrating between said liner and condenser, means for reducing the pressure within the condenser, and a plurality of cooling coils in engagement with the outer walls of the condenser to effect a heat transfer.

References Cited in the file of this patent

UNITED STATES PATENTS

| 1,482,684 | Hortvet | Feb. 5, 1924 |
| 1,662,070 | Lyford | Mar. 13, 1928 |
| 1,888,996 | McInerny et al. | Nov. 29, 1932 |
| 1,955,272 | Carl et al. | Apr. 17, 1934 |
| 2,035,453 | Betterton | Mar. 31, 1936 |
| 2,113,230 | Ceccon | Apr. 5, 1938 |
| 2,258,374 | Amati | Oct. 7, 1941 |
| 2,289,328 | Pechukas | July 7, 1942 |
| 2,304,463 | Maier | Dec. 8, 1942 |

FOREIGN PATENTS

| 552,254 | Great Britain | Mar. 30, 1943 |